Sept. 27, 1949.                    R. B. CLAY                       2,483,312
                                    VALVE
                              Filed Aug. 2, 1944

INVENTOR
ROBERT B. CLAY
BY Cecil F. Arens
ATTORNEY

Patented Sept. 27, 1949

2,483,312

UNITED STATES PATENT OFFICE 2,483,312

VALVE

Robert B. Clay, South Bend, Ind., assignor to Bendix Aviation Corporation, South Bend, Ind., a corporation of Delaware Application August 2, 1944, Serial No. 547,689

4 Claims. (Cl. 277—3)

This invention relates to valves for use in a hydraulic system and more particularly to valves of the type adapted to confine the hydraulic fluid within certain regions of the system.

In many hydraulic systems employing fluid actuated motor units for moving instrumentalities such as rudders, ailerons, wing flaps, etc., it is desirable to provide means for locking the motor in preselected positions. This may be done mechanically, for example, or hydraulically, by precluding the escape of the hydraulic fluid acting on the motor once the desired position of an instrumentality associated with the motor has been determined.

It is therefore one of the objects of this invention to provide a valve which will lock or trap the fluid pressure acting on a motor unit for moving its associated instrumentality when the desired movement has been attained.

Another important object of the invention resides in the provision of a valve which will maintain the instrumentality in its preselected position irrespective of extraneous forces tending to move the same.

Still other objects and advantages of this invention will be apparent from a consideration of the following detailed description, taken in connection with the accompanying drawing, which is for purposes of illustration only, and not intended to define the scope of the invention.

Figure 1:
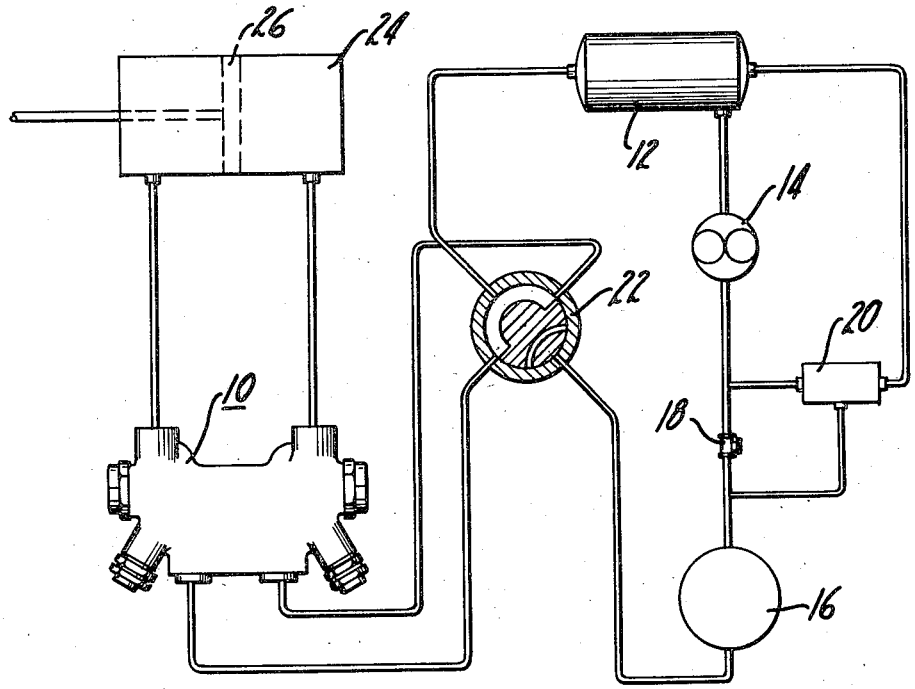
Figure 1 shows the valve of the invention incorporated into a hydraulic system, which is diagrammatically shown, adapted to supply fluid under pressure to a single fluid actuated motor unit which may be connected to an instrumentality, not shown.
Figure 2:
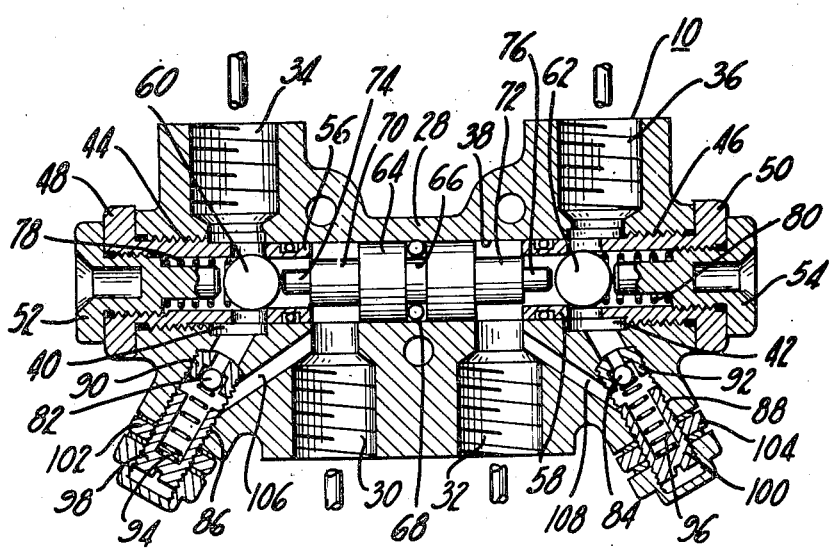
Figure 2 is an enlarged sectional view of the valve of Figure 1.

Referring to the drawing, the reference numeral 10 designates the valve of this invention connected to a hydraulic system comprising a reservoir 12, a pump 14, an accumulator 16, a check valve 18 for preventing the accumulator pressure from backing up into the system, a pressure regulator 20 for by-passing the hydraulic fluid after the accumulator pressure has attained a predetermined value, a four-way valve 22 and a motor unit 24 for operating the instrumentality.

The valve 10 is adapted to lock or confine fluid in the system between the valve and the motor unit 24 so that any extraneous forces acting on the instrumentality with which the motor unit is associated will not cause movement of piston 26 of the motor unit and consequent movement of the associated instrumentality. The valve comprises a body 28 having ports 30 and 32 and cylinder ports 34 and 36 adapted to be connected to a hydraulic system. The ports 30 and 32 may serve as inlet and exhaust ports respectively or vice versa depending upon the direction of fluid flow through said ports as determined by the position of valve 22. A bore 38 in body 28 connects the inlet and exhaust ports to the cylinder ports. The bore is recessed at 40 and 42 and threaded at 44 and 46 to receive internally threaded plugs 48 and 50 which threadedly receive adjusting means or stops 52 and 54. Valve seating elements 56 and 58 disposed in the ends of bore 38 provide seating means for valve members 60 and 62 which seal or lock the fluid in the hydraulic system between the valve and the motor unit.

A piston or plunger 64 slidably fitted into the bore 38 is grooved at 66 for receiving a sealing ring 68 which divorces the inlet and exhaust ports within the bore. Reduced portions 70 and 72 of plunger 64 are provided with integral projections 74 and 76 respectively for engaging the valve members 60 and 62 to thereby urge the same from seating relationship with respect to the valve seating elements 56 and 58. The valve members 60 and 62 are normally urged onto their seats by springs 78 and 80. The adjusting means or stops 52 and 54 may be adjusted to limit the movement of valve members 60 and 62 from their seats.

For relieving excessive pressure in that portion of the system between the valve and motor unit, that is, that portion of the system in which the fluid is locked, valve means 82 and 84 are provided in body 28.

The valve means 82 and 84 are responsive to pressures at cylinder ports 34 and 36 respectively to thereby release any pressure in these ports above a predetermined value. The body is drilled and threaded at 86 and 88 to engage valve seats 90 and 92 on which the valve means 82 and 84 are adapted to seat. Springs 94 and 96 urge the valve means against their seats. Adjustable elements 98 and 100 threadedly engage the body member at 86 and 88 for varying the force transmitted by springs 94 and 96 to the valve means 82 and 84. That is, this adjustment determines the pressure in ports 34 and 36 at which the valve means is to respond to release excessive pressures in these ports. Lock nuts 102 and 104 retain the adjustable elements 98 and 100 in any desired setting. Passages 106 and 108 connect ports 34 and 36 to ports 30 and 32 respectively for by-passing fluid under pressure at a time when the pressure in the ports 34 and 36 rises above a predetermined value.

Operation of the valve is as follows:

Assuming that the four-way valve 22 has been rotated from an "on" position shown to the "off" position, fluid under pressure will have been trapped in the cylinder 24 by action of the valve members 60 and 62 seating on the valve seating elements 56 and 58. Obviously, any extraneous forces which may be applied to piston 26 through any instrumentalities, not shown, connected to the piston, will tend to move the piston in a direction depending on the direction of the applied force. However, any attempted movement of piston 26 to the right or left by such extraneous forces will only urge the valve means 60 and 62 more tightly against their seats to prevent the escape of fluid. With the valve in this position any rise in pressure above a predetermined value in ports 34 or 36 due to an increase in temperature for example, will unseat the valve means 82 or 84 to by-pass the fluid to the lines connecting ports 30 or 32.

With valve 22 rotated so that fluid pressure enters port 30, valve means 60 will be unseated against spring 78 by the fluid under pressure, whereby piston 26 will be moved to the right as viewed in the drawing. Concurrently, with the unseating of valve means 60, plunger 64 is displaced to the right by the fluid under pressure acting on the left end of the plunger and the projection 76 engages valve means 62 to thereby move the same from its seat. This movement of the valve means 62 from its seat allows the escape of fluid from the right side of cylinder 24 to exhaust. It should be noted that the escape of fluid is not unimpeded. To maintain control over the piston 26 throughout its stroke, it is necessary to provide control over the escape of fluid to exhaust. This is done by proportioning the diameter of the reduced portion 72 of plunger 64 with respect to the diameter of the bore through the valve seating element 58 into which the plunger moves. The reduced portion 70 is also proportioned with respect to the valve seating element 56 in the same manner. This cooperation of valve seating elements 56 and 58 with the reduced portions 70 and 72 of plunger 64 provides a valve means for controlling the exhaust fluid.

What I claim is:

1. A valve of the type described for use in a hydraulic system where it is desirable to lock-in the hydraulic fluid acting on a fluid motor to prevent movement of said motor at times comprising a body member having a bore therein, cylinder ports communicating with the ends of the bore, inlet and exhaust ports communicating with the ends of said bore, valve seating elements in the ends of the bore and disposed between the cylinder ports and the inlet and exhaust ports, valve members normally seated on said valve seating elements and arranged to unseat in response to inlet pressure, and a plunger in said bore shiftable therein in response to the difference in pressure in said inlet and exhaust ports, said plunger having ends formed for engagement with said valve members for unseating the same and for cooperating with the valve seating elements for restricting the flow past whichever valve member is unseated by the plunger.

2. A valve of the type described for use in a hydraulic system where it is desirable to lock-in the hydraulic fluid acting on a fluid motor to prevent movement of said motor at times comprising a body member having a bore therein, cylinder ports communicating with the ends of the bore, inlet and exhaust ports communicating with the ends of said bore, valve seating elements in the ends of the bore and disposed between the cylinder ports and the inlet and exhaust ports, valve members normally spring urged to seat on said valve elements and arranged to unseat in response to inlet pressure, and a plunger in said bore shiftable therein in response to the difference in pressure in said inlet and exhaust ports, said plunger having ends formed for engagement with said valve members for unseating the same and for cooperating with the valve seating elements for restricting the flow past whichever valve member is unseated by the plunger.

3. A valve of the type described for use in a hydraulic system where it is desirable to lock-in the hydraulic fluid acting on a fluid motor to prevent movement of said motor at times comprising a body member having a bore therein, cylinder ports communicating with the ends of the bore, inlet and exhaust ports communicating with the ends of said bore, valve seating elements in the ends of the bore and disposed between the cylinder ports and the inlet and exhaust ports, valve members normally spring urged to seat on said valve elements and arranged to unseat in response to inlet pressure, and a plunger in said bore shiftable therein in response to the difference in pressure in said inlet and exhaust ports, said plunger having ends formed for engagement with said valve members for unseating the same and for cooperating with the valve seating elements for restricting the flow past whichever valve member is unseated by the plunger, and adjusting means in the ends of said bore to vary the amount of movement of said valve members from their seats.

4. A valve of the type described for use in a hydraulic system where it is desirable to lock-in the hydraulic fluid acting on a fluid motor to prevent movement of said motor at times comprising a body member having a bore therein, cylinder ports communicating with the ends of the bore, inlet and exhaust ports communicating with the ends of the bore, valve seating elements in the ends of the bore and disposed between the cylinder ports and the inlet and exhaust ports, ball valves in the ends of the bore normally spring urged to seat on said valve elements and arranged to unseat by inlet pressure, and a plunger reciprocable in the bore and constructed and arranged to respond to inlet pressure to unseat one or the other of said ball valves to exhaust the fluid and including reduced end portions on the plunger constituted to cooperate with said valve seating elements to restrict the flow of fluid from the exhaust port.

ROBERT B. CLAY.

REFERENCES CITED

The following references are of record in the file of this patent:

UNITED STATES PATENTS

| Number | Name | Date |
| --- | --- | --- |
| 708,332 | Ennor | Sept. 2, 1902 |
| 1,080,000 | Citroen | Dec. 2, 1913 |
| 1,309,076 | Paine | July 8, 1919 |
| 1,590,226 | Boisset | June 29, 1926 |
| 1,955,154 | Temple | Apr. 17, 1934 |
| 2,172,981 | Maglott | Sept. 12, 1939 |
| 2,316,944 | Ernst | Apr. 20, 1943 |
| 2,389,654 | VanDerWerff | Nov. 27, 1945 |